United States Patent [19]

Latham

[11] 3,865,576

[45] Feb. 11, 1975

[54] METHOD OF MELTING SOLID CHARGES IN OPEN HEARTH FURNACE

[75] Inventor: James Albert Latham, Bilston, England

[73] Assignee: British Steel Corporation, London, England

[22] Filed: Dec. 27, 1973

[21] Appl. No.: 428,653

[30] Foreign Application Priority Data
Jan. 11, 1973 Great Britain.................... 1566/73

[52] U.S. Cl. ......................... 75/43, 75/44 S, 75/60
[51] Int. Cl. .............................................. C21c 5/04
[58] Field of Search ............. 75/43, 44 R, 44 S, 60; 266/35; 432/180, 181, 182

[56] References Cited
UNITED STATES PATENTS

| | | | |
|---|---|---|---|
| 1,811,459 | 6/1931 | Dyrssen .............................. | 432/182 |
| 2,515,670 | 7/1950 | Slottman et al......................... | 75/43 |
| 3,129,930 | 4/1964 | Labat-Camy ........................... | 75/43 |

Primary Examiner—L. Dewayne Rutledge
Assistant Examiner—M. J. Andrews
Attorney, Agent, or Firm—Bacon & Thomas

[57] ABSTRACT

A method of steelmaking in an open hearth furnace in which scrap charges are introduced into the furnace at both ends adjacent the burners and, after completion of charging the burners at both ends are simultaneously fired, the gaseous products of combustion being exhausted through both the downtake and the (normal) uptake during this period. Following this the normal regenerative melting/refining cycle is conducted and the hot metal charge is added.

Regenerative heating may be conducted during charging.

Oxygen/oil is consumed at the burners and they are adjustable to follow the melting 'front' the technique being to bore through the charge so that the scrap overhang shields the furnace roof.

10 Claims, 3 Drawing Figures

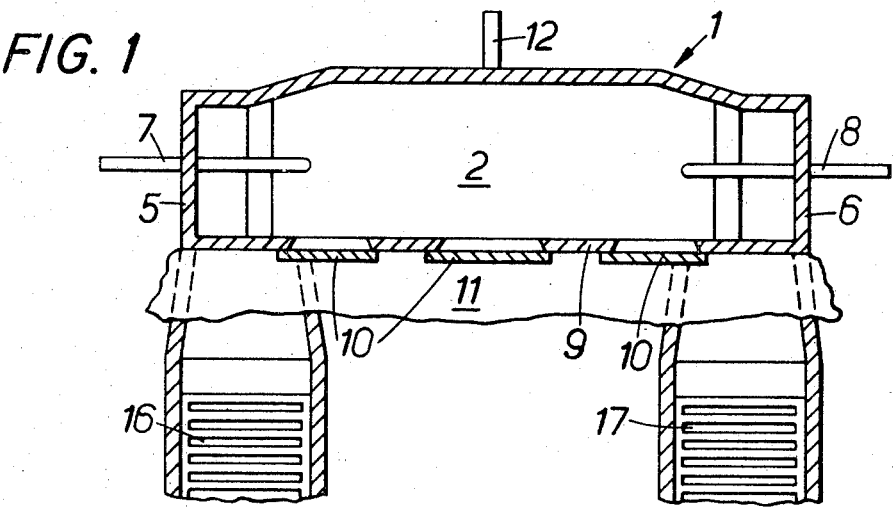
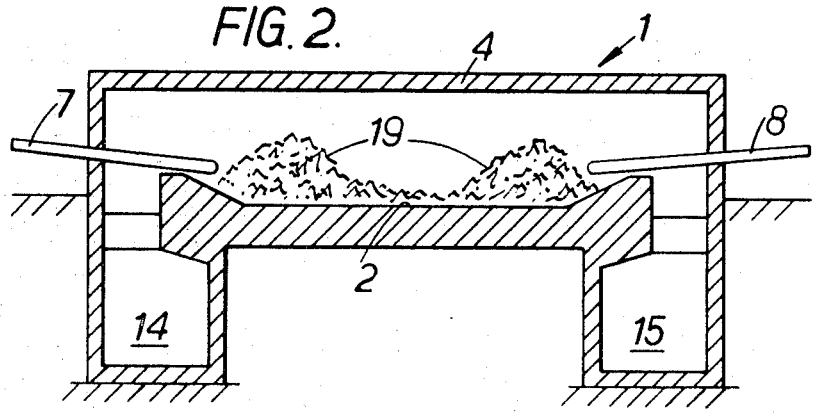
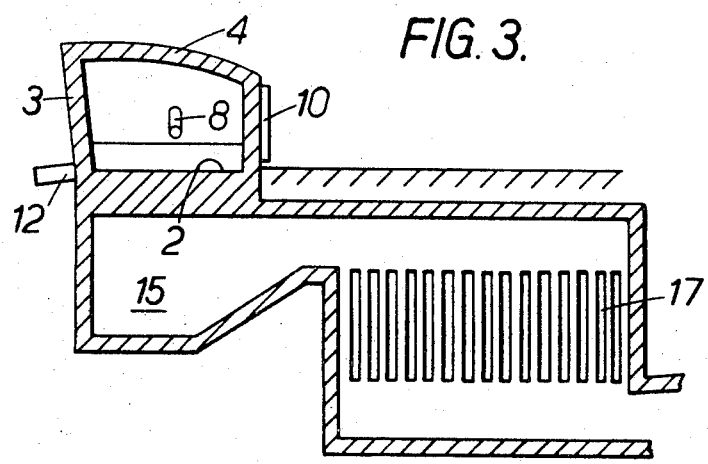

METHOD OF MELTING SOLID CHARGES IN OPEN HEARTH FURNACE

This invention relates to steelmaking and more particularly, relates to steelmaking practice in openhearth furnaces.

In open-hearth practice a mixed charge of liquid iron and steel, and solids, e.g. (scrap or pig iron) is usually employed. Alternatively, an all solid charge may be used or sometimes even an all liquid charge.

With charges involving solids the scrap or pig iron is usually charged uniformly along the furnace hearth and in the case of a mixed charge is at least partially melted before the liquid charge is introduced. A substantial proportion of the charge-to-tap cycle in such practices is taken up in the melt-down period of the solids, and it is an object of this invention to increase the melting rate of the latter.

From one aspect the present invention consists in a method of steelmaking in an open-hearth furnace in which solid charges are introduced into the furnace at both ends adjacent to the burners, and following completion of charging, before conducting the regenerative melting/refining cycle the charges are at least partially melted by firing the burners at both ends together, the gaseous products of combustion being exhausted through both the downtake and the (normal) uptake during this period.

Regenerative heating is preferably conducted during charging and the 'double-end' firing of the burners may even be initiated before completion of charging.

Preferably oxygen is employed during double-end firing and the burners may be adjustable to follow the melting 'front' of the solid charge for greater efficiency the flame being directed so as to 'bore' through the pile. In this way the furnace roof is shielded by the scrap overhang and heat is conserved. Preferably the burners are directly opposed to one another lying in a common plane but are inclined downwardly at a small angle, e.g. 7° to 20°, preferably 7° to 11°, depending on the furnace design. The angle of inclination may be variable and they may be movable axially so as to follow the molten front as mentioned.

In accordance with this invention then, the solid charge, e.g. scrap, is rapidly melted during this double-end firing period prior to the adoption of the principal regenerative cycle and the addition of molten metal (with a mixed charge). In this way much faster charge-to-tap times can be achieved than hitherto without excessive roof temperatures being attained or any noticeably adverse effect on refractory wear; in fact the wear rate may be less than with conventional practice. Fuel savings are also achieved by reason of the shorter cycle time and although more oxygen is consumed thermal efficiency is higher as compared with the normal practice of using air or air enriched with oxygen.

Furthermore, there is less fume since there is substantially no oxygen impingement on a 'liquid' bath to vaporize the iron. In addition, there is significant local recycling of any such fume around the burners, as much as 30 percent or more, which apart from reducing fume conserves heat. Slag is also cleaner because non-metallic parts of the charge are burned off instead of remaining present in the slag.

Reduction in charge-to-tap times of 25 percent or more may be achieved as compared with conventional practice and these savings can be achieved simply by adopting the method in accordance with this invention on existing plant without any significant design changes being required.

The invention is equally applicable to basic and acid open-hearth practice.

In order that this invention may be fully understood one embodiment thereof will now be described, by way of example, with reference to the accompanying drawings, in which:

FIG. 1 is a plan view;
FIG. 2 is a side elevation; and
FIG. 3 is an end elevation of a conventional basic open-hearth furnace, all the drawings being schematic only.

The scrap charging disposition which is peculiar to the double-end firing technique of this invention is shown only in FIG. 2 for clarity.

Referring now to the drawings, the furnace comprises an elongated refractory lined chamber 1 with a hearth 2 formed in its base, a plain back 3 and roof 4 with end walls 5, 6 through which two fuel (e.g., coal tar, oil or gas) burners 7, 8 extend. A front wall (9) has three doors 10 through which the furnace is charged from the level of the floor 11 and a tapping spout 12 protrudes from the furnace rear. The ends of the chamber 1 surmount two slag pockets 14, 15 each of which communicates with a regenerator chamber housing a chequerwork 16, 17 of refractory bricks from which flues extend to fume cleaners (if any) and the smoke stack (not shown). The flues are separately coupled to the stack via individually operable sliding gates or dampers.

In normal operation of an open-hearth furnace with a mixed charge, scrap and limestone is charged uniformly along the length of the hearth, one of the burners, say, 7 is ignited and air is blown in through the appropriate flue to the chamber 16/pocket 14 into the burner area. The gas passage adjacent this burner thus becomes an 'uptake'. Flames from the burner spread out over the charge in the hearth and the combustion products are exhausted through the slap pocket 15 through the 'downtake' passage passing through the chamber 17 (which abstracts heat from the gases) and out of the stack via the appropriate damper which is 'open'.

After a certain melting period determined by a number of factors, including the temperature of the regenerator brickwork in the heated chamber 17, the flow pattern is reversed; burner 7 is extinguished and burner 8 is ignited. Air is now blown in via the chamber 17/pocket 15 into the area of the burner 8. The hot air passage adjacent this burner now becomes an 'uptake' whereas the passage adjacent the extinguished burner 7 now becomes the 'downtake'. The combustion products are exhausted through the slag pocket 14/regenerator chamber 16 so that the brickwork in the latter is now heated whilst that in the regenerator 17 is cooled by the incoming air.

The regenerative pattern is then continuously reversed at intervals so the burners always burn hot air from the regenerator heated during the previous cycle.

This pattern of heating continues throughout the charging period (which may be one hour or so) and after the completion of charging.

After the scrap has melted or substantially so, and the charge has reached the required state of oxidisation, a hot metal charge of molten pig iron is introduced through one of the doors promoting a 'carbon boil' and regenerative heating continues as before during the subsequent refining period but practice may demand that the burner rate is varied. At the completion of the refining period the molten charge is tapped from the furnace.

In the foregoing discussion on general open-hearth practice, it is to be understood that various changes may be made, for example, oxygen lancing may be used selectively during the melting/refining cycle, and the charging practice, addition of fluxing agents etc. may be changed in accordance with a variety of conditions.

Referring now to the method according to this invention, the practice with regard to the scrap charging and the initial melting period is modified, and oxygen is used selectively at the burners.

In particular, scrap is initially charged through the two end doors of the furnace and is banked up in piles 19 adjacent the burners. This is effected as quickly as possible to conserve the charge-to-tap time and limestone is added at this juncture in the normal way. Some scrap may also be charged through the centre door. FIG. 2 shows a typical layout. During this period normal regenerative firing is adopted.

Following completion of charging the dampers on the flues to the stack are both partially opened and the forced air supply is arrested. Both fuel burners 7, 8 are now ignited in oxygen which may be supplied from a separate lance alongside the burner or, more conveniently, custom-built oxy/fuel burners may be utilised. With both burners in operation they each locally melt the scrap banks at a very high rate as is customary with oxy/fuel practice in other processes and since they are downwardly inclined at an angle, say, 7° to 11°, they tend to bore through the scrap in the region of the base of the hearth. The resulting scrap overhang thus protects the furnace roof. During this period the combustion products are exhausted through both regenerator chambers/flue passages and no air is entrained at the burners. As mentioned, both dampers are partially opened and it is calculated that about 70 percent of the waste gas products leave the furnace by this route whilst the remainder is locally re-circulated and entrained around the burners to be more fully consumed.

Scrap melting in this manner continues for as long as possible consistent with good steelmaking practice but is likely to be determined by the temperature of the chequers since both are of course being heated during this double end firing.

Thus when the temperature of these refractories attain a predetermined limiting value, one of the burners is extinguished, the oxygen is arrested, the flue dampers are opened or closed appropriately and air is forced through for commencement of the conventional regenerative cycle again.

Thereafter the process continues in the cyclic manner as described with the addition of hot metal and fluxing agents etc.

In a typical heat with a method according to this invention giving the furnace priority as compared with the other furnaces in the bank, 84 tons of scrap was charged into the furnace in the mannr described. This was completed in one hour during which normal regenerative firing was adopted, the scrap being alternately charged at the ends remote from the ignited burner. At the completion of charging double end firing was adopted for about 40 minutes until the temperature of the refractories in the regenerator chambers rose to 1200°C – 1250°C. The conventional regenerative cycle was then re-commenced and 45 tons of hot metal was charged about 80 minutes later. Refining was complete after a little less than a further 2 hours. This gave a total charge-to-tap time of a little under 5 hours whereas conventional practice on this furnace with the same charge has previously given a little over 7 hours charge-to-tap time using oxygen enriched air.

Fuel consumption on the double end firing (coal tar) was about one-third less than with the normal process but oxygen consumption was up to about double the normal amount a moderate excess of oxygen being required for complete combustion around the burners.

In another typical heat in which the furnace used was not given priority over the others 77 tons of scrap was charged into the furnace alternately at different ends as before. Charging was completed in 1¾ hours. Double end firing was then adopted for ½ hour at the completion of which the first ladle of hot metal was charged and the regenerative cycle re-commenced. A second ladle of hot metal was added about ¾ hour later making a total of 52 tons of hot metal. Melt down was completed after a further ¼ hour and refining was completed after a further 2 hours. This practice thus gave a charge-to-tap time of 5¼ hours which with a fettling period of about 40 minutes gave a tap-to-tap time of 5 hours 55 minutes against 7 hours 50 minutes under standard practice. Fuel consumption with this practice was 48 therms/ton against 65 therms/ton standard and oxygen consumption was 1150 cu.ft./ton against 440 cu.ft/ton standard.

Substantial savings thus accrue from this invention and more significantly these are obtained with existing plant very little modification being required (if necessary) to the burners to effect axial movement and to provide an oxygen supply.

Although this method has been described with reference to the specific embodiment shown, it is to be understood that various modifications may readily be made without departing from the scope of this invention. For example, more than one burner can be provided at each end to increase the rate of melting or provision could be made for lateral movement of the burner(s) to provide greater flexibility. Furthermore, although reference has been made to liquid fuel, gas, particularly natural gas, could alternatively be used in conjunction with oxygen. Oxygen-enriched air could alternatively be used but efficiency is likely to be reduced.

It is also possible to initiate double end firing before completion of charging particularly after the end piles have been well banked up.

An all scrap charge could also be used instead of a mixed metal charge to which reference has been made the same double end firing technique before commencement of the regenerative cycle proper would still be appropriate.

I claim:

1. A method of steelmaking in an open hearth furnace having a downtake channel and an uptake channel at opposite ends of the furnace proper and burners at both said ends wherein regenerative melting and refining is conducted comprising the steps of introducing solid charges into the furnace at both ends adjacent the burners and, following completion of charging and before conducting the regenerative melting/refining cycle, simultaneously firing the burners at both ends whereby the charges at both ends of the furnace are at least partially melted, and exhausting the gaseous products of combustion through both said downtake and the uptake channels during such simultaneous firing.

2. A method according to claim 1, in which the burners are simultaneously fired at both ends before completion of the introduction of the solid charge.

3. A method according to claim 1, in which regenerative heating is conducted during the introduction of the solid charges before the burners are simultaneously fired at both ends.

4. A method according to claim 2, in which the scrap charges are banked up at each end of the furnace adjacent the burners and the burners are inclined downwardly so that the flames therefrom tend to bore through the solid charge banks and are shielded from the furnace roof.

5. A method according to claim 4, in which the burners are inclined at an angle of 7° to 11° to the horizontal and lie in a common vertical plane.

6. A method according to claim 5, in which the burners are axially movable to follow the melting 'front' of the charge.

7. A method according to claim 6, in which both oxygen and a hydrocarbon fuel are consumed by the burners.

8. A method according to claim 7, in which hot metal is charged into the furnace during the regenerative melting cycle.

9. A method according to claim 8, in which hot metal is charged into the furnace immediately on commencement of the regenerative melting cycle.

10. A method of steelmaking in an open hearth furnace having a downtake and an uptake at opposite ends of the furnace area and oxy/fuel burners at both said ends and wherein regenerative melting and refining is conducted comprising the steps of introducing, solid charges into the furnace at both ends and banked up adjacent the burners, conducting regnerative heating with alternate burner firing during the introduction of the solid charges and, following completion of charging and before conducting the major regenerative melting/refining cycle, simultaneously firing the burners at both said ends, and exhausting the gaseous products of combustion through both said downtake and said uptake during this simultaneous firing.

11. A method according to claim 10, in which the burners are inclined downwardly so that the flames therefrom tend to bore through the charge banks and are shielded from the furnace roof and in which the burners are moved in the direction of their axes to follow the melting 'front' of the charges.

12. A method according to claim 11, in which hot molten metal is charged into the furnace during the regenerative melting cycle, part of the hot metal being introduced immediately on commencement of the regenerative melting cycle.

* * * * *